May 21, 1968     P. G. SAUNDERS     3,383,969
STEEL RULE CUTTING DIES
Filed Nov. 14, 1966     2 Sheets-Sheet 1
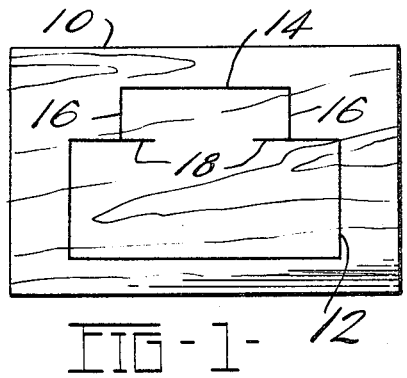
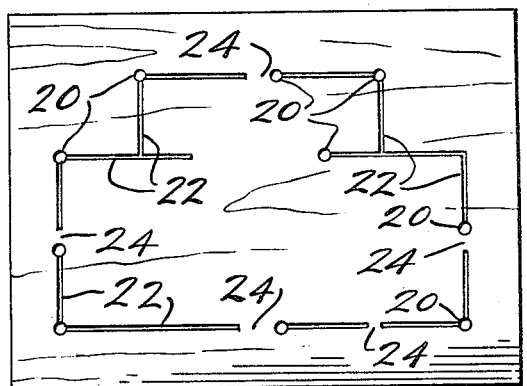
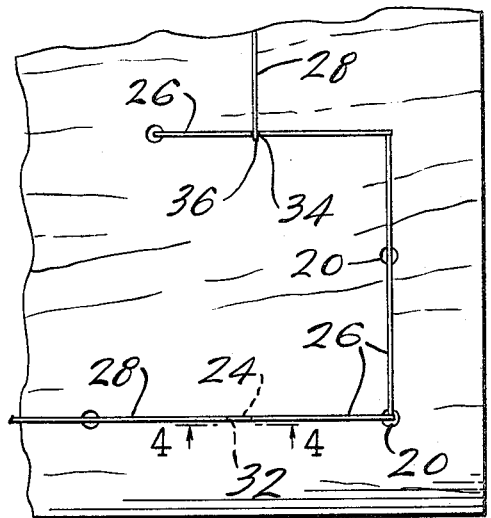
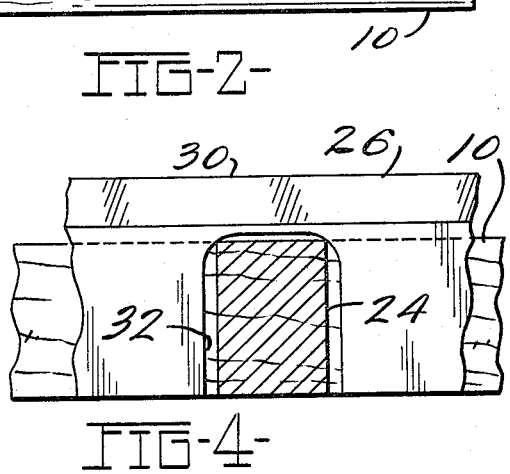
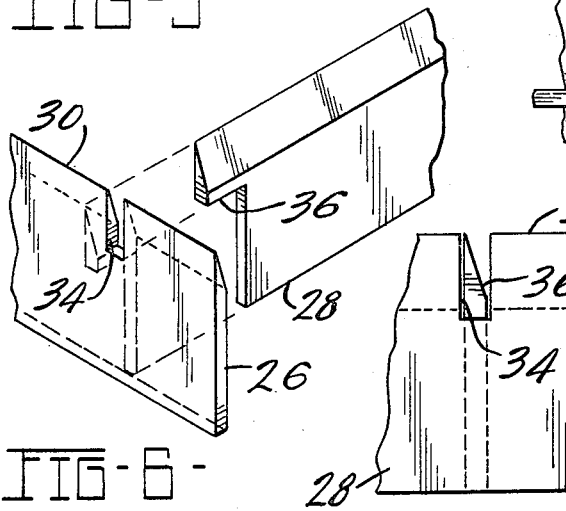
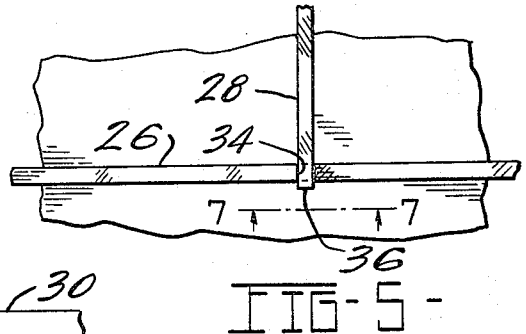
INVENTOR:
PHILIP G. SAUNDERS.
BY
ATT'YS May 21, 1968 P. G. SAUNDERS 3,383,969
STEEL RULE CUTTING DIES
Filed Nov. 14, 1966 2 Sheets-Sheet 2
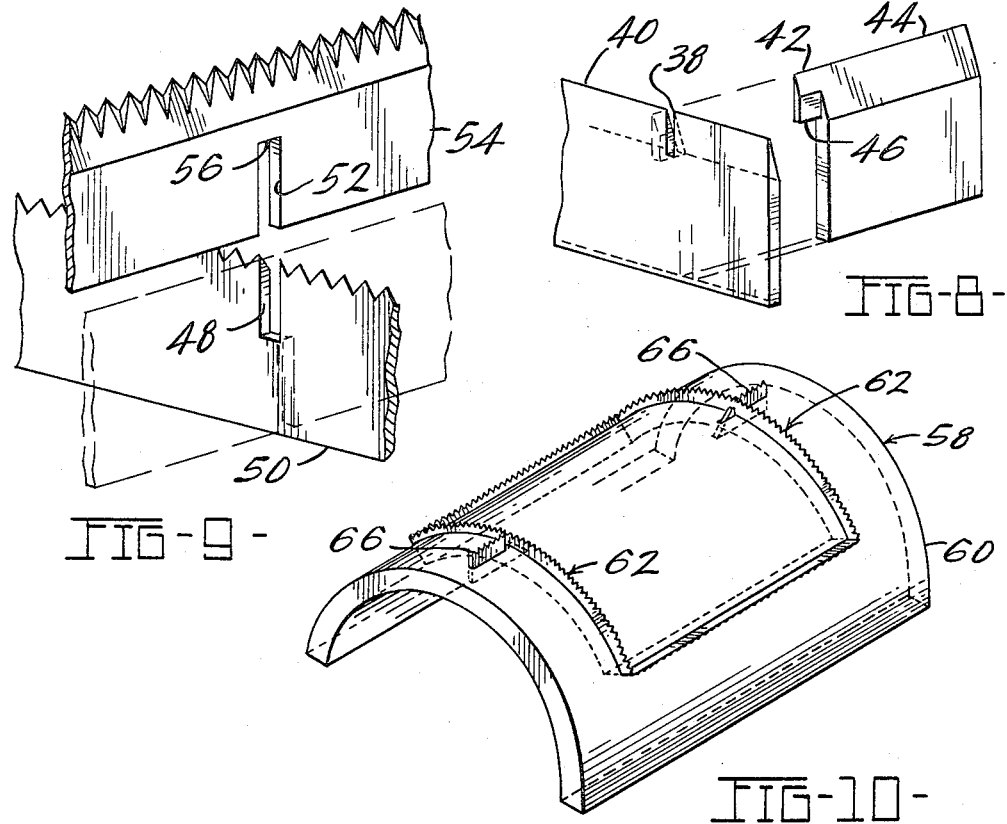
INVENTOR:
PHILIP G. SAUNDERS.
BY
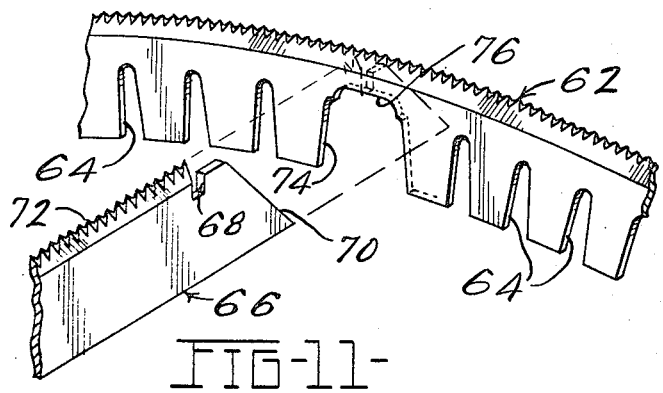
ATT'YS.

United States Patent Office 3,383,969
Patented May 21, 1968

3,383,969
STEEL RULE CUTTING DIES
Philip G. Saunders, 2425 Ryan Road,
Toledo, Ohio 43614
Filed Nov. 14, 1966, Ser. No. 593,920
11 Claims. (Cl. 83—663)

This invention relates to cutting dies and particularly to cutting dies employing steel cutting rules for cutting and shaping cardboard and the like for containers and other applications.

Cutting dies for cutting sheet material, particularly corrugated cardboard and other paper, to a particular shape can be either of the flat type or the rotary type. Flat dies are easier to make but rotary dies are capable of substantially higher production. With the flat dies, the sheet material to be cut and shaped is fed one piece at a time under the cutting die which is brought down to cut the sheet against a steel plate. With the rotary type of cutting die, the sheet material is fed in strip form between the rotary die and a plastic backing member in a continuous manner, with the production of the rotary die being at least five or six times as fast as that achieved with a flat die.

In the production of dies for this purpose, the desired shape of the final product is first laid out on a back plate. Slots are then cut in the plate in the appropriate locations and cutting dies, commonly known as steel rule cutting dies, are placed in the slots, after which resilient ejection blocks or members are placed adjacent the cutting rule dies at appropriate locations to aid in separating the cardboard from the dies after being cut.

With dies of this nature, a problem has long existed where one steel cutting rule meets another one at an angle. Even though the end of the one rule which meets the other one is shaped carefully and is positioned very closely to the second rule, a small space between the end of the first rule and the second is almost inevitable. During the operation of the die, minute pieces of the material being cut are pushed into the space between the two rules, forcing them apart. This forces the second rule to slant away from the first which throws the cutting line of the second rule out of position and eventually may cause the second rule not to cut at all because of its angular position relative to the backing plate.

In accordance with the invention, a steel cutting rule joint has been devised for meeting or intersecting steel cutting rules which join in a manner to prevent possible separation of the rules by accumulation of material between them. Even though a gap may exist at the joint, any material forced into the gap will not cause transverse movement or separation of either of the cutting die rules and will not cause subsequent malfunctioning of the dies.

It is, therefore, a principal object of the invention to provide improved steel rule cutting dies.

Another object of the invention is to provide steel rule cutting dies with cutting rule joints which prevent separation of the cutting rules during operation of the dies.

Still another object of the invention is to provide steel rule cutting dies having a longer effective life.

Other objects and advantages of the invention will be apparent from the following detailed description of a preferred embodiment thereof, reference being made to the accompanying drawings, in which:

FIG. 1 is a plan view of a die back plate with an outline of a pattern drawn thereon;

FIG. 2 is an enlarged view of the same plate with holes and slots cut therethrough along the lines of the desired pattern;

FIG. 3 is an enlarged, fragmentary view of a portion of FIG. 2 showing cutting rules mounted in the slots of the die back plate;

FIG. 4 is a further enlarged view in vertical section taken along the line 4—4 of FIG. 3;

FIG. 5 is a further enlarged, plan view of a cutting rule joint shown in FIG. 3;

FIG. 6 is an enlarged, fragmentary, exploded view in perspective of two meeting cutting rules, as shown in FIG. 5;

FIG. 7 is a further enlarged view of the joint, taken along the line 7—7 of FIG. 5;

FIG. 8 is an exploded view similar to FIG. 6 of a slightly modified joint of two intersecting cutting rules;

FIG. 9 is another exploded view similar to FIG. 6 of another slightly modified joint of two intersecting cutting rules;

FIG. 10 is a view in perspective of rotary cutting dies embodying the invention; and FIG. 11 is an exploded view in perspective of a slightly modified die rule joint shown in FIG. 10.

With flat cutting dies, the dies are mounted on the upper platen of a cutting die machine and cardboard or other material to be cut is placed on a flat metal lower platen. Material of the required size is then fed onto the lower platen and the dies moved downwardly to cut the material to the desired shape. The material blank cut by the dies is then removed and another piece inserted. With this type of operation, perhaps two thousand blanks can be cut per hour under ideal conditions. With a rotary cutting die machine, the dies are mounted on a cylinder and rotated in one direction continuously. A plastic platen is used below the dies and the material fed therebetween. Production of ten to twelve thousand blanks per hour can be achieved with this operation.

The making of the dies for the cutting die machines requires considerable time and effort. A die back plate of proper size and thickness is first selected. This plate commonly is made of high quality five-eights inch plywood but can also be other high strength materials, such as certain plastic laminations. The shape of the blank to be cut, along with any pertinent fold lines, is then drawn on the die plate. This can be accomplished by using an actual sample of the die blank or a drawing thereof.

Referring to FIG. 1, solely for purposes of illustration, a flat die plate 10 is shown with an outline of a blank thereon from which corrugated cardboard will be cut to the shape indicated. The blank shown includes a large generally rectangular portion 12 and a tab 14 having end portions 16 which can be bent out of the plane of the tab 14 by slots 18 which will be cut in the blank.

After the outline of the carton blank is placed on the die plate 10, appropriate slots are cut in the die plate over the lines to receive the cutting blades or steel cutting rules which project from the plane of the die plate and cut the cardboard stock along the proper lines.

Referring to FIG. 2, holes 20 are drilled in the die plate 10 at appropriate positions to receive a saw blade which cuts slots 22 through the die plate along the lines drawn thereon previously. A suitable portable sabre saw can be used for this purpose. The slots 22 are not continuous around the entire outline of the carton blank but stop short of one another at appropriate places to form bridges 24 by means of which the center portion of the die plate maintains structural integrity with the marginal portion.

When the slots are completed, steel cutting rules 26 and 28 (FIG. 3), after shaping and cutting to length, are hammered into place in the slots with a friction fit, by means of a suitable mallet. As shown more particularly in FIG. 4, the cutting rules 26 and 28 extend above the surface of the die plate 10 approximately one-fourth inch and terminate in a beveled cutting edge 30. The edge can be beveled on one side, as shown, or both sides. The edge also can be scalloped or serrated, particularly for rotary cutting dies. Notches 32 are cut in the steel rule at the appropriate positions where the bridges 24 are located to enable the rules to receive the bridges 24 and still maintain continuity of the cutting edge 30. The cutting dies can also employ folding rules and perforating rules, as is known in the art.

The cutting rules are maintained in as long sections as possible with the pattern shown preferably being made with only the two cutting rules 26 and 28. Where one slot extends transversely to and meets an intermediate portion of another, however, separate cutting rules must be used. Heretofore, the one cutting rule simply was placed in abutting relationship with the other cutting rule with the end of the first rule placed as closely as possible to the second one. In fact, where the one cutting rule abutted the side of the other cutting rule having the bevel for the cutting edge 30, the end of the first rule would be ground in a contour to fit with both the main surface of the other cutting rule and the beveled portion. Nevertheless, a small gap often existed between the end of the first cutting rule and the second one. This gap initially was of little concern; however, as the die was used, small pieces of paper became wedged in the gap and these forced the second cutting rule away from the end of the first, throwing the line of cut of the second rule out of position and, as the second rule was pushed further over to a slanted position, it would not cut the carboard cleanly, resulting in stopping production until the dies were repaired or replaced.

In accordance with the invention, a cutting rule joint has been devised which does not have the above problems and which is effective over the life of the dies. Referring to the particular example, after the cutting rule 26 is in place, notches or recesses 34 are ground in the upper cutting edge thereof in alignment with the slots 22 forming the ends of the tab 14. The notches are of sufficient length to extend below the beveled cutting edge 30 and can extend downwardly up to about half the width of the cutting rule 26. Lower portions of the ends of the cutting rule 28 are then removed by grinding to leave upper projections or locking portions 36 which are received in the notches 34. The notches 34 are slightly wider than the thickness of the cutting rule 28 and the projections 36, and the height of the projections 36 is slightly less than the depth of the notches 34.

As shown in FIG. 7, a gap or space will exist between portions of the projection 36 and the side walls of the notch 34 and small pieces of paper or cardboard might become wedged in these spaces. However, no harm will result from such an occurrence because the projection 36 cannot be forced to one side, beyond the limits of the sidewalls of the notch 34 and, similarly, the cutting edges 30 on each side of the notch 34 cannot be separated by any wedging action of the paper. Consequently, a secure junction is obtained with the new joint even though the tolerances are not closely held. Ordinarily, the cutting edge of the projection 36 of the cutting rule 28 will project slightly beyond the cutting edge 30 of the rule 26. However, this does not usually produce any significant effect in the carton blank being made. If such is undesirable, the end of the projection 36 can be ground back slightly at an angle so that the cutting edge of the projection 36 will not extend beyond the cutting edge adjacent the notch 34.

In the event that the gap or space between the projection 36 and the notch 34 as shown in FIG. 7 is objectionable, the joint can be modified slightly as shown in FIG. 8. In this instance, a narrower notch 38 is ground in a first cutting rule 40 and a narrow projection or locking portion 42 is formed at an end of a second rule 44. In this instance, a side 46 of the projection 42 is ground so that the thickness of the projection is only a fraction of the thickness of the cutting rule 44. By way of example, with cutting rules which have a thickness of four points, the notch 38 and the projection 46 can have thicknesses of approximately one and one-half points.

In some instances, the cutting rules may not only meet but will cross one another to form a cross joint as shown in FIG. 9. In such an instance, a deeper notch 48 can be formed in a first cutting rule 50 and a second notch 52 can be formed in a second rule 54 with this notch extending upwardly from the lower edge of the rule. In such an instance, a bar or locking portion 56 is formed in the second cutting rule 54 and is received in the notch 48 in the same manner that the projection 36 of the cutting rule 28 is received in the notch 34 of the cutting rule 26. A section through the joint of FIG. 9 will appear similar to that of FIG. 7 and again no wedging action of paper caught at the joint will be able to force either of the cutting rules out of position.

The invention can be applied with equal efficacy to rotary cutting dies and, in fact, can result in even greater advantages with rotary dies in which stripping can be more of a problem. A segment of rotary cutting dies 58 is shown in FIG. 10. These cutting dies are produced in a manner similar to that for flat cutting dies except that the lines placed on an arcuate die plate 60 are transferred from a drawing or sample by a device which compensates for distortion in the dimensions due to the arcuate nature of the cutting die plate. After the lines are on the die plate, holes and slots are again formed therein with cutting rules then cut to length, shaped, notched, and forced into the slots as before. Cutting rules 62, in this instance, are formed of proper radius for the die plate 60 with the cutting rule 62 having a serrated cutting edge and a plurality of notches 64 in a lower portion thereof, as shown in FIG. 11.

With rotary dies, the scrap formed at the edges of the carton stock must be cut into pieces when formed so that the pieces will not jam the die. To cut the stock scrap at the edges of the die, a plurality of short cutting rules 66 can be located transversely to the cutting rules 62, with each of the cutting rules 66 having a notch 68 therein with a slanting end 70 extending beyond the notch 68. The upper edge of the rule 66 adjacent the notch 68 is below a cutting edge 72 thereof so that the cardboard stock is not cut inside the cutting rule 62. The cutting rule 62 has a large notched portion 74 which extends over a bridge in the die plate 60 and with a slot extending transversely through the bridge to receive the cutting rule 66. The notched portion 74 also forms a bar or locking portion 76 which is received in the notch 68, and also acts as a connection over the bridge for the cutting rule 62. Again, even though the portion 76 is received loosely in the notch 68, neither of the cutting rules 62 nor 66 can be forced out of position.

As mentioned previously, after the cutting rules are assembled with either the flat or rotary dies, suitable ejection blocks, preferably of rubber, are glued to the back plate at suitable intervals along the cutting rules to cause ejection of the cardboard from the dies after it is cut to shape. In addition, either of the back plates can have suitable holes drilled therein to receive fasteners for affixing the back plates to the cutting die platens.

Various modifications of the above described embodiments of the invention will be apparent to those skilled in the art, and it is to be understood that such modifications can be made without departing from the scope of the invention, if they are within the spirit and the tenor of the accompanying claims.

I claim:

1. A cutting die assembly comprising a die plate, a first slot in said die plate, a second slot in said die plate extending transversely to said first slot, a first cutting rule located in said first slot and having a cutting edge therealong extending outwardly from the surface of said die plate, said first cutting rule having a recess therein extending downwardly from the upper edge to a position below the cutting edge of said first cutting rule, said recess being aligned with said second slot, a second cutting rule in said second slot, said second cutting rule having a locking portion at an upper, cutting edge thereof, said locking portion having a thickness and height less than corresponding dimensions of said recess and received in said recess with the cutting edge of said second rule being substantially at the same level as the cutting edge of said first rule.

2. A die assembly according to claim 1 characterized by the cutting edges of said first and second cutting rules being beveled and with the recess in said first cutting rule extending downwardly below the bevel.

3. A die assembly according to claim 1 characterized by said second slot and said second rule crossing said first slot and said first rule and said second cutting rule has full width portions on each side of said locking portion which are received in said second slot on both sides of said first slot.

4. A die assembly according to claim 3 wherein an upper edge of said first cutting rule on one side of said recess is lower than the cutting edge on the other side, and the lower portion terminates nearer the recess than the other portion.

5. In cutting dies for cutting sheet material to a predetermined shape, a first steel cutting rule having an upper cutting edge therealong, a second steel cutting rule extending transversely to said first cutting rule and meeting at an intermediate portion of said first cutting rule, said second rule having at least one main portion and an upper locking portion, said cutting edge of said first cutting rule having a notch therein aligned with said second cutting rule, said second cutting rule having a cutting edge extending along the upper locking portion and forming a continuation of a cutting edge along the main portion, said locking portion being received in said notch of said first cutting rule with the cutting edges of said cutting rules being at substantially the same level, side walls of said notch preventing any substantial transverse movement of said locking portion as a result of any sheet material caught between said locking portion and said first cutting rule.

6. The combination according to claim 5 characterized by the cutting edges of said first and second cutting rules being beveled with the notch in said first cutting rule extending downwardly below the bevel.

7. The combination according to claim 5 characterized by said second cutting rule crossing said first cutting rule and said second cutting rule having main portions on each side of said locking portion.

8. The combination according to claim 5 characterized further by said second cutting rule being formed to a predetermined radius and said first cutting rule being straight.

9. The combination according to claim 8 characterized by said second cutting rule crossing said first cutting rule and having a main portion on each side of said locking portion.

10. The combination according to claim 9 characterized by said first cutting rule having a portion on one side of said notch which is lower than the cutting edge on the opposite side.

11. The combination according to claim 5 wherein the width of said notch and the thickness of said locking portion are less than the thickness of the main portion of said second rule.

References Cited
UNITED STATES PATENTS

| | | | |
|---|---|---|---|
| 2,860,555 | 11/1958 | Williamson | 93—58 |
| 3,182,530 | 5/1965 | Scott et al. | 76—107 |
| 3,292,513 | 12/1966 | Palmer | 93—58 |

BERNARD STICKNEY, *Primary Examiner.*